United States Patent [19]
Aoki et al.

[11] 3,875,119
[45] Apr. 1, 1975

[54] PRODUCT AND PROCESS OF PRODUCING BIAXIALLY ORIENTED INSULATING FILM OF POLYETHYLENE-2,6-NAPHTHALATE

[76] Inventors: Hiroshi Aoki, 2-20, Nakamachi, Koganei-shi, Tokyo; Sakae Shimotsuma, 23-12, 6-chome, Higashi-rinkan, Sagamihara-shi, Kanagawa-ken; Masanori Masuda, 1200-6, Kamitsuruma, Sagamihara-shi, Kanagawa-ken; Takeo Asai, 16-25, 6-chome, Seishin, Sagamihara-shi, Kanagawa-ken; Hujio Matsumoto, 7-12, 5-chome, Seishin, Sagamihara-shi, Kanagawa-ken, all of Japan

[22] Filed: Feb. 15, 1974

[21] Appl. No.: 443,033

Related U.S. Application Data

[63] Continuation-in-part of Ser. No. 210,541, Dec. 21, 1971, abandoned.

[30] Foreign Application Priority Data
Dec. 22, 1970 Japan.............................. 45-116402
Oct. 2, 1971 Japan................................ 46-77299

[52] U.S. Cl.............. 260/75 T, 260/47 C, 264/235, 264/289, 264/291
[51] Int. Cl........................... C08g 17/08, B29d 7/24
[58] Field of Search........ 264/289, 291, 210 R, 235, 264/346, 342 RE; 260/75 T, 47 C

[56] References Cited
UNITED STATES PATENTS

| | | | |
|---|---|---|---|
| 2,968,065 | 1/1961 | Gronholz............................ | 264/289 |
| 2,975,484 | 3/1961 | Amborski.......................... | 260/75 T |
| 3,161,711 | 12/1964 | Tassler............................... | 264/289 |
| 3,501,344 | 3/1970 | Watson et al. ............... | 117/138.8 F |
| 3,683,060 | 8/1972 | Tanabe et al....................... | 264/289 |

*Primary Examiner*—Donald J. Arnold
*Assistant Examiner*—James B. Lowe
*Attorney, Agent, or Firm*—Sherman & Shalloway

[57] ABSTRACT

A biaxially oriented insulating film of polyethylene-2,6-naphthalate containing up to 10 mol percent of a comonomer which can withstand continuous use at high temperatures and has excellent insulating properties and other physical properties. The film has an elongation at breakage of not less than 10 % after heating at 200°C. for 200 hours, a thickness-direction refractive index $[n_z]$ of the film within a range of $1.499 \leq [n_z] \leq 1.520$ and an intrinsic viscosity $[\eta]$ of $0.48 \leq [\eta] \leq 0.70$, with the proviso that $[n_z]$ and $[\eta]$ satisfy the condition that $[n_z] \leq 0.3 \times [\eta] + 1.361$. The film is produced by biaxially orienting the film at stretch ratios of 3–4 in each direction, wherein the stretch ratio in the transverse direction is at least equal to that in the lengthwise direction. The film is then post-heat-treated at 215°–240°C under such conditions as will not allow a shrinkage greater than 10 percent.

5 Claims, No Drawings

PRODUCT AND PROCESS OF PRODUCING BIAXIALLY ORIENTED INSULATING FILM OF POLYETHYLENE-2,6-NAPHTHALATE

This application is a continuation-in-part application of HIROSHI AOKI, et al., Ser. No. 210,541, filed Dec. 21, 1971, now abandoned.

BACKGROUND OF THE INVENTION

1. FIELD OF THE INVENTION

This invention relates to an insulating film composition which can withstand continuous use under high temperature conditions and has excellent electrical insulating characteristics in combination with satisfactory physical properties.

2. DISCUSSION OF THE PRIOR ART

It is known that polyethylene-2,6-naphthalate is an orientable, crystalline polymer capable of being shaped into filament or film and that its second transition point is about 110°C. which is higher by about 50°C. than the second transition point of polyethylene terephthalate and its melting point is about 270°C. which is higher by about 10°C. than the melting point of polyethylene terephthalate.

More than 20 years have passed since this polymer was first discovered (see the specification of British Pat. No. 604,073), but hardly any proposals have been made as to the preparation of oriented films from this polymer. As far as applicants are aware, until very recently the prior art only taught the preparation of film from a polyethylene terephthalate containing 2,6-naphthalene dicarboxylate in an amount of less than 25 % of the recurring structural units of the polymer (see the specification of U.S. Pat No. 3,161,710). However, film prepared from such copolyester fails to provide an insulating film possessing in combination excellent electrical-insulating characteristics and sufficient physical properties to stand continuous use under high temperature conditions, such as intended in this invention.

More recently, however, U.S. Pat. No. 3,683,060 disclosed a method for producing biaxially drawn polyethylene-2,6-naphthalate films having superior physical properties in the machine direction such as tensile strength and Young's modulus, particularly useful as a base of magnetic recording tape, prepared by stretching an undrawn film of polyethylene 2,6-naphthalate, consisting essentially of ethylene 2,6-naphthalate units (which may be modified by up to 10 mol % of a third component or third components) and having an intrinsic viscosity of at least 0.35, first in the machine direction to 3.5–5 times the original length and then in the transverse direction at a draw ratio 50–90 % of that of the machine direction stretching. However, this reference only discloses heat treatment subsequent to the biaxial drawing at a temperature of 210°C. or less, with the lengthwise draw ratio and widthwise draw ratio less than 4 times their original respective lengths. Moreover, this reference suggests that contrary to the discovery made by the present inventors, unsatisfactory results are obtained when the respective lengthwise draw ratio and widthwise draw ratio are less than 4 times their original lengths. As will be seen below in connection with the examples and comparative examples of the present specification, when the post-heat-treatment temperature falls below 215°C. or above 240°C. or when the lengthwise draw ratio and/or widthwise draw ratio are above about 4, polyethylene-2,6-naphthalate films having the desired physical properties for the purposes of the present invention cannot be obtained. In particular, it will be seen that such films have a lower elongation at breakage after strenuous heat treatment and do not pass the heat resistance test as set forth below.

The specification of U.S. Pat. No. 3,501,344 proposes a magnetic recording tape supported on polyethylene-2,6-naphthalate. According to this proposal, a film of polyethylene-2,6-naphthalate biaxially oriented by the biaxial stretching is subjected to a heat-setting or crystallizing treatment under restraint against shrinkage at a temperature usually above 120°C. and up to about 250°C. or more in some cases, preferably 200°–240°C. The heat-set film can be heat-relaxed within the same temperature range without restraint against shrinkage. It is proposed that the biaxial stretching of unstretched film is performed by stretching the film at 105° – 150°C. (preferably 115° – 140°C.) in the lengthwise direction from about 3.5 to about 6.0 (preferably from 4.0 to 5.5) times its original length and then stretching the film advantageously at 105° – 150°C.) in the transverse or widthwise direction anywhere from about 0.9 to about 1.4 (preferably about 1.0 to about 1.3) times its original width, i.e., from about zero stretch up to about a 40% widthwise stretch. This biaxially oriented and post-heat-treated film is then coated with a nonmagnetic binder in which are dispersed magnetizable particles of $Fe_2O_3$ or similar magnetically susceptible material.

SUMMARY OF THE INVENTION

We have conducted research with a view to providing an insulating film composition formed from polyethylene-2,6-naphthalate which exhibits not only electrical-insulating characteristics but also satisfactory physical properties when used continuously for a long time under high temperature conditions, and we have now found that in the case of polyethylene-2,6-naphthalate, the stretch history during the biaxial stretching, the heat history during the post heat treatment and the post heat treatment conditions very greatly influence the physical properties of the resulting biaxially oriented and post-heat-treated film, especially properties desired in insulating films, and that known techniques of preparing biaxially oriented films which have been applied to other polymers such as polyethylene terephthalate cannot be directly applied to polyethylene-2,6-naphthalate.

For instance, it has now been found that the thickness-direction refractive index $[n_z]$ of the biaxially oriented and post-heat-treated film is considerably changed by the heat history, the stretch history and the post heat treatment conditions, with the result that the elongation at breakage of the film measured when it is subjected to further heat treatment at 200°C. for 200 hours under such conditions as will allow free shrinkage of the film, is greatly influenced. Thus, we have now found that only when the above-mentioned factors satisfy certain requirements, can there be obtained a biaxially oriented and post-heat-treated polyethylene-2,6-naphthalate insulating film which is very useful because of a combination of excellent electrical-insulating characteristics and physical properties sufficient to withstand continuous use for a long time under high temperature conditions.

Accordingly, a primary object of this invention is to provide a biaxially oriented and post-heat-treated polyethylene-2,6-naphthalate film which possesses in combination physical properties sufficient to withstand continuous use under high temperature conditions and excellent electrical-insulating characteristics.

An additional primary object of this invention is to provide a process for preparing such a film.

Other objects and advantages of this invention will be apparent from the description given hereinbelow.

DETAILED DESCRIPTION OF THE INVENTION

The film possessing the desired properties is obtained according to the present invention with a biaxially oriented and post-heat-treated polyethylene-2,6-naphthalate insulating film composition consisting essentially of polyethylene-2,6-naphthalate in which at least 90 mol percent of the structural units are ethylene-2,6-naphthalate units, and at most 10 mol percent of the structural units are derived from a comonomer having a divalent ester-forming functional group, the film being produced by biaxially stretching an unstretched film under heating conditions and post-heat-treating the film to a temperature of from 215°C. to 240°C. under such conditions as will not allow free shrinkage of the film; characterized in that (i) the stretch ratio in the widthwise direction and in the lengthwise direction are both within a range of from about 3 to about 4 times based on the original width or length respectively, of the unstretched film, with the proviso that the stretch ratio in the widthwise direction is at least 1 time, preferably 1 – 4/3 times, more preferably 1 – 1.2 times, and especially preferably 1 – 1.1 times, the stretch ratio in the lengthwise direction; (ii) when the biaxially-oriented and postheat-treated film is subjected to further heat treatment at 200°C. for 200 hours under such conditions as will allow free shrinkage of the film, the elongation at breakage of the resulting film is not less than 15 %, especially preferably not less than 20 %; and (iii) the thickness-direction refractive index $[n_z]$ of the biaxially-oriented and post-heat-treated film, measured at 20°C. by Abbe's refractometer with use of a ray of a wavelength of 589 m$\mu$, is within a range expressed by the following formula:

$$1.499 \leq [n_z] \leq 1.520$$

preferably $$1.500 \leq [n_z] \leq 1.515$$

and the intrinsic viscosity $[\eta]$ of the film, measured at 35°C. in a mixed solvent of phenol:2,4,6-trichlorophenol of a weight ratio of 6:4, is within a range expressed by the following formula:

$$0.48 \leq [\eta] \leq 0.70$$

with a proviso that above $[n_z]$ and $[\eta]$ satisfy the following condition:

$$[n_z] \leq 0.3 \times [\eta] + 1.361$$

According to the process of the present invention biaxially oriented and post-heat-treated polyethylene-2,6-naphthalate insulating film composition is prepared by biaxially stretching an unstretched polyethylene-2,6-naphthalate film composition consisting essentially of polyethylene-2,6-naphthalate in which at least 90 mol percent of the structural units are ethylene-2,6-naphthalate units, and at most 10 mol percent of the structural units are units derived from a comonomer or comonomers having a divalent, esterforming functional group or groups, at a stretch ratio in the widthwise direction within a range of from about 3 to about 4 times based on the original width of the unstretched film, and the stretch ratio in the lengthwise direction is within a range of from about 3 to about 4 times based on the original length of the unstretched film, with a proviso that the stretch ratio in the widthwise direction is 1 – 4/3 times the stretch ratio in the lengthwise direction, the stretching in the widthwise direction being conducted at 115° – 150°C. and the stretching in the lengthwise direction being conducted at 120° – 160°C., and then subjecting the biaxially stretched film to the post-heat-treatment at 215° – 240°C. under such conditions as will not allow a shrinkage greater than 10 %, and preferably 0 %, i.e. constant film length, to thereby obtain a biaxially oriented and post-heat-treated film wherein the elongation at breakage of the resulting film is not less than 15 %, when the film is subjected to further heat treatment at 200°C. for 200 hours under such conditions as will allow free shrinkage of the film; and the thickness-direction refractive index $[n_z]$ of the biaxially oriented and post-heat-treated film, measured at 20°C. by Abbe's refractometer, with use of a ray of a wavelength of 589 m$\mu$, is within a range expressed by the following formula:

$$1.499 \leq [n_z] \leq 1.520$$

and the intrinsic viscosity $[\eta]$ of the film, measured at 35°C. in a mixed solvent of phenol: 2,4,6-trichlorophenol of a weight ratio of 6:4, is within a range expressed by the following formula:

$$0.48 \leq [\eta] \leq 0.70$$

with a proviso that about $[n_z]$ and $[\eta]$ satisfy the following condition:

$$[n_z] = 0.3 \times [\eta] + 1.361$$

As the polyethylene-2,6-naphthalate to be used as the base polymer in this invention, there may be employed any polymer in which at least 90 mol percent of the structural units are ethylene-2,6-naphthalate units. Accordingly, by the term "polyethylene-2,6-naphthalate" used herein is meant not only a homopolymer of ethylene-2,6-naphthalate but also a polyethylene-2,6-naphthalate modified with no more than 10 mol percent, preferably less than 5 mol percent, of a comonomer or comonomers having a divalent, esterforming functional group or groups or a modifier. Since a film of polyethylene-2,6-naphthalate modified with more than 10 mol percent of such comonomer or comonomers or modifier is likely to be degraded during the heat treatment, such modified polymer cannot be used in this invention.

In general, polyethylene-2,6-naphthalate is prepared by reacting naphthalene-2,6-dicarboxylic acid or its functional derivative with ethylene glycol or its functional derivative in the presence of a catalyst or catalysts. Reaction conditions and operation procedures are well known in the art and are disclosed in, for instance, the above-mentioned specifications. In case a comonomer or comonomers or modifier is used in an amount of less than 10 mol percent, prior to completion of the reaction of forming polyethylene-2,6-naphthalate, one or more suitable comonomers or modifiers are added to the polymerization system and then the reaction is completed to form a copolyester or mixed polyester.

As such comonomer or modifier, there may be employed compounds having a divalent, ester-forming, functional group. Examples of such compounds are dicarboxylic acids such as oxalic acid, adipic acid, phthalic acid, isophthalic acid, terephthalic acid, naphthalene-2,7-dicarboxylic acid, succinic acid, diphenyl ether dicarboxylic acid and lower alkyl esters of these dicarboxylic acids; hydroxycarboxylic acids such as p-hydroxybenzoic acid and p-hydroxyethoxybenzoic acid, and lower alkyl esters of these hydroxycarboxylic acids; and dihydric alcohols such as neopentyl glycol diethyleneglycol and trimethylene glycol. Polyethylene-2,6-naphthalate or its modified polymer may have the terminal hydroxyl and/or carboxyl groups capped with a monofunctional compound such as benzoic acid, benzoyl benzoic acid, benzyloxybenzoic acid and methoxypolyalkylene glycol. It is also possible to use polyethylene-2,6-naphthalate modified with a very small amount of a polyfunctional compound such as glycerin and pentaerythritol to such an extent that the linearity of the polymer is not substantially lost.

It is possible to incorporate in such starting polyethylene-2,6-naphthalate various additives known in the film manufacture field. Examples of such additives are delustering agents such as titanium dioxide, stabilizers such as phosphoric acid, phosphorous acid and esters of these acids, and slip agents such as finely divided silica and china clay.

It is preferred that the polyethylene-2,6-naphthalate to be used in this invention has an intrinsic viscosity [$\eta$] in the range of from 0.50 to 0.80, because polymers having such intrinsic viscosity [$\eta$] exhibit good processability when shaped into films.

The intrinsic viscosity [$\eta$] referred to in this invention is one determined by the measurement conducted with respect to the polymer in a mixed solvent consisting of phenol and 2,4,6-trichlorophenol (phenol: 2,4,6-trichlorophenol weight ratio - 6:4) at 35°C., the unit being 100 cc/g.

The thickness-direction refractive index [$n_z$] referred to in this invention is the value determined by the measurement conducted at 20°C. by means of Abbe's refractometer with use of a ray having a wavelength of 589 m$\mu$(the center of D-line).

An unstretched film suitable for use in the formation of the biaxially oriented and post-heat-treated film may be prepared according to customary methods adopted for film formation in the art. Usually, the starting polyethylene-2,6-naphthalate is dried to remove water therefrom, melted by an extruder or the like, extruded, ridded of trash or dirt, and then shaped into a film. During such shaping process the degree of polymerization of the polymer is reduced, and the intrinsic viscosity [$\eta$] of the unstretched film greatly varies depending on conditions of drying and extruding the starting polymer and other factors. Still further, the thickness-direction refractive index [$n_z$] of the biaxially oriented and post-heat-treated film varies depending on the above-mentioned change in the intrinsic viscosity [$\eta$] of the starting unstretched film and on the stretching and post-heat-treatment conditions. As a result of our researches on the relation between the changes of the intrinsic viscosity [$\eta$] and the thickness-direction refractive index [$n_z$], it has been found that in order to provide the resulting biaxially oriented and post-heat treated polyethylene-2,6-naphthalate film with a combination of physical properties sufficient to withstand continuous use under high temperature conditions and excellent electrical-insulating characteristics, it is necessary that a specific relationship be established between the intrinsic viscosity [$\eta$] and thickness-direction refractive index [$n_z$] in the resulting film.

More specifically, we have now found that in the intended biaxially oriented and post-heat treated insulating film derived from polyethylene-2,6-naphthalate, the thickness-direction refractive index [$n_z$] should be within a range expressed by the following formula:

1.499 $\leq$ [$n_z$] $\leq$ 1.520 (preferably 1.500 $\leq$ [$n_z$] $\leq$ 1.515), the intrinsic viscosity [$\eta$] should be within a range expressed by the following formula:

$$0.48 \leq [\eta] \leq 0.70,$$

and the above [$n_z$] and [$\eta$] should satisfy the following condition:

$$[n_z] \leq 0.3 \times [\eta] + 1.361.$$

It has also been found that in addition to the above requirements for the intrinsic viscosity [$n_z$] and [$\eta$], an additional requirement must be satisfied with respect to the stretch ratio in order for the resulting film to have suitable physical properties sufficient to withstand continuous use under high temperature conditions. More specifically, it has now been found that in the biaxially stretched film of the present invention, it is essential that the stretch ratio in either the widthwise direction or lengthwise direction should be within a range of from about 3 to about 4 and the stretch ratio in the widthwise direction should be at least 1 time (i.e. equal), preferable 1 – 4/3 times, more preferably 1 – 1.2 times, especially preferably 1 – 1.1 times the stretch ratio in the lengthwise direction. In case the stretch ratio in the widthwise direction is less than 1 time the stretch ratio in the lengthwise direction, when the resulting film is subjected to high temperature conditions for a long period of time, there is a tendency that the elongation at breakage in the widthwise direction is disadvantageously lowered. In case the stretch ratio in the widthwise direction is above the previous range, for instance, the stretch ratio in the widthwise direction is more than 4/3 times the stretch ratio in the lengthwise direction, the elongation at breakage in the lengthwise is likewise disadvantageously reduced. In order to provide the resulting film with a combination of physical properties sufficient to withstand continuous use under high temperature conditions and excellent electrical-insulating characteristics, it is important that the stretch ratio in either the lengthwise or the widthwise direction should be within the above range and the above proportional relation should be established between the stretch ratios in both the lengthwise and widthwise directions.

Biaxially stretched and post-heat-treated polyethylene-2,6-naphthalate insulating films meeting the above requirements (i) and (iii) usually have an elongation at breakage of not less than 10 % after they have been subjected to further heat treatment at 200°C. for 200 hours under such conditions as will allow free shrinkage. In order to obtain the desired properties according to the present invention, biaxially stretched and post-heat-treated films having an elongation at breakage of not less than 15 %, preferably not less than 20 %, after the above-mentioned additional heat treatment are suitable.

In the present invention the elongation at breakage of the resulting post-heat-treated film is much more balanced both in the lengthwise direction and the widthwise direction.

In order to obtain the biaxially oriented and post-heat-treated polyethylene-2,6-naphthalate insulating film composition of this invention, such conditions as the intrinsic viscosity $[\eta]$ of the unstretched film, the unstretched film-preparing conditions, the stretch ratios in the biaxial stretching, the temperature conditions in the biaxial stretching, the post-heat treatment temperature conditions and the degree of restraint of free shrinkage in the post-heat treatment may be readily chosen and combined experimentally with above requirements (i), (ii) and (iii) as criteria to be satisfied although these conditions cannot be determined independently in an absolute manner. For better illustration, selection of such conditions and preparation of the film composition of this invention will now by described with reference to the following detailed description.

Chips of polyethylene-2,6-naphthalate having an intrinsic viscosity $[\eta]$ of, for example, 0.50 – 0.80 are dried for several hours by hot air maintained at 170° – 200°C., and melted, metered and extruded by an extruder maintained at 285° – 310°C. The resulting extrudate is then shaped into an unstretched film by a customary film-shaper. The unstretched film is stretched in the lengthwise direction about 3 to about 4 times the original length at about 120° to about 160°C. and stretched in the widthwise direction from about 3 to about 4 times the original width at about 115° to about 150°C., preferably about 125° to about 150°C. in such a manner that the stretch ratio in the widthwise direction will be at least equal to the stretch ratio in the lengthwise direction. Then, the biaxially stretched film is subjected to heat treatment at about 215° to about 240°C. under such conditions as will not allow free shrinkage of the film. In general, this heat treatment is conducted under such restraint conditions as will keep the film length constant or as will not allow a shrinkage greater than 10 %.

The period of time for the above post-heat-treatment is usually less than about 10 minutes, and generally can be selected within the range of from about 3 – 200 seconds. In the process of the present invention, the post-heat-treatment residence time is not critical, and may vary over a wide range depending on the draw ratio and temperature of heat treatment. The optimum residence time, depending on the above parameters, can be easily determined by a person of ordinary skill in the art; and, in general, when the post-heat-treatment temperature is within the range of 215° – 240°C., residence time of less than about 10 minutes will produce satisfactory results.

The biaxially oriented and post-heated-treated polyethylene-2,6-naphthalate insulating film composition of the present invention exhibits excellent electrical characteristics, for instance, high dielectric breakdown strength, high surface resistivity and high volume resistivity at such high temperatures as 155°C. or higher, and almost constant dielectric characteristics at temperatures ranging from −60°C. to +180°C. Further, the films of this invention are excellent in mechanical properties such as tensile strength, Young's modulus, end-breaking resistance, tear resistance and impact strength, and have a low thermal shrinkage without any restraint against shrinkage and an excellent heat resistance sufficient to withstand continuous use at 155°C. (heat resistance grade F for insulating materials according to the test recommended by the International Organization for Standardization - ISO). Still further, they are sufficiently resistant against various insulating oils, Freon, refrigerator oils, organic solvents and plasticizers, and as compared with polyethylene terephthalate films, the films of this invention are not readily hydrolyzed. Accordingly, biaxially oriented and post-heat-treated film compositions of this invention are very excellent as insulating materials.

The films of this invention may be directly used as insulating materials for various electric and electronic machines and Instruments, i.e. for layer/barrier insulation and phase insulation for instance, as tapings for electric and electronic machines and Instruments, materials for slot liner, coil separator, and as dielectric materials for condensers. Further, they may be laminated with other insulating materials such as cloth, paper, glass and other inorganic substances and they may be utilized in the form of composite products.

This invention will now be illustrated by the following non-limiting examples and comparative examples.

Tensile mechanical properties given in the examples were determined at 23°C. in an atmosphere of 65 % relative humidity by employing an Instron tensile tester under the following conditions:

Sample form: strip (15 cm × 1 cm)
Chuck distance: 10 cm
Pulling rate: 10 cm/min

According to the present invention, there is measured each in the lengthwise direction and the widthwise direction the elongation at breakage of the resulting film when the film is subjected to further heat treatment at 200°C. for 200 hours under such conditions as will allow free shrinkage of the film. The elongation at breakage is expressed as the smaller of the two values measured, i.e. the worse result.

The intrinsic viscosity $[\eta]$ referred to above, namely the intrinsic viscosity measured at 35°C. in a mixed solvent of phenol:2,4,6-trichlorophenol of 6:4 weight ratio and the intrinsic viscosity $[\eta]_{ocp}$ measured at 35°C. in o-chlorophenol, satisfies the following relation:

$$[\eta] = 1.008 \times [\eta]_{ocp} + 0.0128$$

EXAMPLES 1 TO 9 AND COMPARATIVE EXAMPLES 1 TO 2

Chips of polyethylene-2,6-naphthalate having an intrinsic viscosity $[\eta]$ of 0.64 was dried at 180°C. for a period sufficient to reach the water content as indicated in Table 1, and were melted at 290° – 300°C. The melt was extruded while adjusting the residence time as indicated in Table 1, and the extrudate was quenched and solidified on a casting drum maintained at 50°C. to obtain an unstretched film having a thickness of about 600 $\omega$. The unstretched film was subjected to step-wise biaxial stretching and heat treatment under conditions indicated in Table 1. The resulting biaxially oriented and post-heat-treated film was positively deteriorated under the relax state at 200°C. in air, and the change in the mechanical properties in the lengthwise direction was examined. Results are shown in Table 2.

Table 1

| | Conditions for Forming Unstretched Films | | | Stretching Conditions (Requirement i) | | | | | Post Heat Treatment Conditions | | |
|---|---|---|---|---|---|---|---|---|---|---|---|
| | Water content of starting chips (% by weight) | Melting temperature (°C.) | Residence time (min) | Direction (L)** | | Direction (W)* | | Stretch ratio (W)/ stretch ratio (L)*** | Temperature (°C.) | Time (sec) | Conditions allowing no free shrinkage |
| | | | | Temperature (°C.) | Stretch ratio | Temperature (°C.) | Stretch ratio | | | | |
| Ex. 1 | 0.001 | 290 | 15 | 133 | 3.4 | 133 | 3.7 | 1.1 | 235 | 10 | 3% in W |
| Ex. 2 | 0.001 | 293 | 10 | 135 | 3.7 | 138 | 4.0 | 1.07 | 240 | 15 | 3% in W |
| Ex. 3 | 0.001 | 290 | 10 | 140 | 3.5 | 135 | 3.8 | 1.08 | 238 | 5 | under tension |
| Ex. 4 | 0.002 | 295 | 15 | 135 | 3.3 | 130 | 3.6 | 1.1 | 230 | 10 | do. |
| Ex. 5 | 0.003 | 300 | 10 | 135 | 3.5 | 130 | 3.7 | 1.06 | 227 | 18 | do. |
| Ex. 6 | 0.002 | 300 | 20 | 130 | 3.6 | 135 | 3.8 | 1.06 | 220 | 10 | do. |
| Ex. 7 | 0.004 | 300 | 15 | 140 | 3.5 | 125 | 3.5 | 1.00 | 225 | 15 | do. |
| Ex. 8 | 0.03 | 290 | 10 | 140 | 3.5 | 135 | 3.6 | 1.03 | 240 | 15 | do. |
| Ex. 9 | 0.012 | 295 | 15 | 140 | 3.5 | 135 | 3.6 | 1.03 | 240 | 15 | do. |
| Comp. Ex.1 | 0.012 | 295 | 10 | 135 | 3.6 | 120 | 3.5 | 0.97 | 250 | 10 | do. |
| Comp. Ex. 2 | 0.025 | 300 | 15 | 140 | 3.5 | 125 | 3.5 | 1.00 | 240 | 15 | do. |

Notes:
* Direction (W) designates the widthwise direction, which will apply to Tables given below.
** Direction (L) designates the lengthwise direction, which will apply to Tables given below.
*** Each value was determined by counting fractions of 0.005 and over as 0.01 and disregarding the rest.

Table 2

| | Requirement (iii) of Resulting Films: | | | Requirement (ii) of Resulting Films: Elongation at Breakage (%) after further heat treatment 200°C., 200 hrs. under free shrinkage | Breaking Strength (kg/cm$^2$) of Resulting Films after further heat treatment 200°C., 200 hrs. under free shrinkage | Heat Resistance Test* | |
|---|---|---|---|---|---|---|---|
| | [nz] | [η] | 0.3×[η]+1.361 | | | | |
| Ex. 1 | 1.507 | 0.56 | 1.529 | 38 | 1540 | passed | |
| Ex. 2 | 1.515 | 0.58 | 1.535 | 40 | 1620 | | do. |
| Ex. 3 | 1.519 | 0.60 | 1.541 | 51 | 1590 | | do. |
| Ex. 4 | 1.504 | 0.55 | 1.526 | 37 | 1510 | | do. |
| Ex. 5 | 1.502 | 0.54 | 1.523 | 40 | 1580 | | do. |
| Ex. 6 | 1.499 | 0.53 | 1.520 | 43 | 1590 | | do. |
| Ex. 7 | 1.505 | 0.52 | 1.517 | 27 | 1480 | | do. |
| Ex. 8 | 1.509 | 0.50 | 1.511 | 30 | 1550 | | do. |
| Ex. 9 | 1.507 | 0.49 | 1.508 | 22 | 1480 | | do. |
| Comp. Ex. 1 | 1.514 | 0.50 | 1.511 | 3 | 1180 | not passed | |
| Comp. Ex. 2 | 1.506 | 0.47 | 1.502 | 4 | 1050 | | do. |

* According to the test recommended by the International Organization for Standardization.

EXAMPLES 10 TO 12 AND COMPARATIVE EXAMPLES 3 TO 5

Chips of polyethylene-2,6-naphthalate having an intrinsic viscosity [η] indicated in Table 3 were melted and extruded in the same manner as in Example 1 to obtain an unstretched film having a thickness of about 600 μ. The unstretched film was biaxially stretched and post-heat-treated under conditions indicated in Table 3 to obtain a biaxially stretched and post-heat-treated film having an intrinsic viscosity [η] and a thickness-direction refractive index [n$_z$], each of which is indicated in Table 3.

Physical properties of each film before and after the further heat treatment at 200°C. for 200 hours without any restraint against shrinkage are shown in Table 4.

Table 3

| | Stretching Conditions | | | | Post Heat Treatment Conditions | | | Resulting Films | |
|---|---|---|---|---|---|---|---|---|---|
| | Direction (L) | | Direction (W) | | Temperature (°C.) | Time (sec.) | Conditions allowing free shrinkage | [η] | [nz] |
| | Temperature (°C.) | Stretch ratio | Temperature (°C.) | Stretch ratio | | | | | |
| Example 10 | 140 | 3.5 | 135 | 3.5 | 225 | 15 | under tension | 0.60 | 1.514 |
| Example 11 | 130 | 3.6 | 145 | 3.8 | 225 | 10 | 4% in W | 0.53 | 1.520 |
| Comparative Example 3 | 140 | 3.6 | 145 | 3.5 | 240 | 15 | under tension | 0.53 | 1.522 |
| Example 12 | 130 | 3.5 | 135 | 3.5 | 225 | 10 | do. | 0.70 | 1.520 |
| Comparative Example 4 | 140 | 3.6 | 145 | 3.5 | 230 | 8 | do. | 0.70 | 1.522 |
| Comparative Example 5 | 135 | 3.6 | 120 | 3.5 | 245 | 15 | do. | 0.50 | 1.520 |

Table 4

|  | Before Further Heat Treatment | | After Further Heat Treatment | | |
| --- | --- | --- | --- | --- | --- |
|  | Breaking Strength (kg/cm²) | Elongation at Breakage (%) | Breaking Strength (kg/cm²) | Elongation at Breakage (%) | Heat Resistance Test* |
| Example 10 | 2300 | 70 | 1680 | 50 | passed |
| Example 11 | 2150 | 55 | 1400 | 35 | passed |
| Comparative Example 3 | 2150 | 50 | 1200 | 6 | not passed |
| Example 12 | 2350 | 73 | 1750 | 38 | passed |
| Comparative Example 4 | 2250 | 70 | 1250 | 7 | not passed |
| Comparative Example 5 | 2100 | 51 | 1100 | 5 | not passed |

* According to the test recommended by ISO.

EXAMPLES 13 TO 15 AND COMPARATIVE EXAMPLES 6 TO 7

An unstretched film of an ethylene-2,6-naphthalate copolymer of an intrinsic viscosity $[\eta]$ of 0.60 formed by copolymerization employing as the dicarboxylic acid component 97 mol percent of naphthalene-2,6-dicarboxylic acid and 3 mol percent of terephthalic acid was stretched in both the lengthwise and widthwise directions coincidentally at a stretch ratio of 3.5 in each direction at 130°C., and the stretched film was post-heat-treated at 230°C. under tension (Example 13).

An unstretched film of an ethylene-2,6-naphthalate copolymer of an intrinsic viscosity $[\eta]$ of 0.56 formed by copolymerization employing as the dicarboxylic acid component 96.5 mol percent of naphthalene-2,6-dicarboxylic acid and 3.5 mol percent of terephthalic acid. The unstretched film was stretched in both the lengthwise and widthwise directions at a stretch ratio of 3.6 in each direction at 135°C., and post-heat-treated at 235°C. under tension for 10 seconds (Example 14).

A comparison product was prepared in the same manner as in Example 13 except that an ethylene-2,6-naphthalate copolymer obtained by the copolymerization using as the dicarboxylic acid component 85 mol percent of nathphalene-2,6-dicarboxylic acid and 15 mol percent of terephthalic acid was employed as the starting polymer (Comparative Example 6).

As another comparison product, there was provided a commerically available biaxially stretched post-heat-treated polyethylene terephthalate film (Comparative Example 7).

These films were subjected to the further heat treatment at 200°C. for 200 or 400 hours under conditions allowing free shrinkage. After such further heat treatment, the breaking strength, the elongation at breakage and the dielectric breakdown strength of the films were determined. Results are shown in Table 5, where data of the film of Example 15 derived from the polymer free of any terephthalic acid comonomer are also shown.

Table 5 (A)

|  | | | | Tested Films Before Further Heat Treatment | | | | |
|  | | | | Stretch Ratio | | | Breaking Strength (kg/cm²) | Elongation at Breakage (%) |
| --- | --- | --- | --- | --- | --- | --- | --- | --- |
|  | $[\eta]$ | [nz] | 0.3×$[\eta]$+1.361 | (L) | (W) | (W)/(L) |  |  |
| Example 15 | 0.68 | 1.497 | 1.541 | 3.5 | 3.6 | 1.03 | 2300 | 76 |
| Example 13 | 0.68 | 1.500 | 1.541 | 3.5 | 3.5 | 1.00 | 2300 | 75 |
| Example 14 | 0.56 | 1.510 | 1.529 | 3.6 | 3.6 | 1.00 | 2210 | 73 |
| Comparative Example 6 | 0.56 | 1.506 | 1.529 | 3.6 | 3.6 | 1.00 | 1700 | 80 |
| Comparative Example 7 | — | — | — | — | — | — | 2210 | 126 |

Table 5 (B)

|  | After Further Heat Treatment | | | |
|  | 200°C., 200 hrs. under free shrinkage | | 200°C., 400 hrs. under free shrinkage | |
|  | Breaking Strength (kg/cm²) | Elongation at Breakage (%) | Breaking Strength (kg/cm²) | Elongation at Breakage (%) |
| --- | --- | --- | --- | --- |
| Example 15 | 1680 | 53 | 1590 | 21 |
| Example 13 | 1840* | 56* | 890* | 29* |
| Example 14 | 1660* | 53* | 770* | 23* |
| Comparative Example 6 | 810 | 7 | 620 | 4 |
| Comparative Example 7 | 790 | 5 | 580 | 2 |

* Treatment temperature was 220°C.

EXAMPLES 16 TO 18 AND COMPARATIVE EXAMPLES 8 TO 11

Unstretched polyethylene-2,6-naphthalate film having an intrinsic viscosity $[\eta]$ of 0.55 was stretched in the lengthwise and widthwise directions under conditions indicated in Table 6 by the subsequent biaxial stretching method and post-heat-treated at 225°C. for 10 seconds under tension to obtain a biaxially oriented film. The resulting film was subjected to the thermal deterioration treatment under the relaxed state in the air at 200°C. Tensile mechanical properties in the lengthwise and widthwise directions of the film were determined before and after the above deterioration treatment. Results are shown in Table 6.

Table 6

| | Stretching Conditions | | | | | W stretch ratio/L | | Tensile Mechanical Properties | | | |
|---|---|---|---|---|---|---|---|---|---|---|---|
| | L direction | | W direction | | stretch ratio | | | Before thermal deterioration | | After thermal deterioration | |
| | Temperature (°C.) | Stretch ratio | Temperature (°C.) | Stretch ratio | | [n$_z$] | Direction | Breaking strength (kg/cm²) | Elongation at breakage (%) | Breaking strength (kg/cm²) | Elongation at breakage (%) |
| Ex. 16 | 130 | 3.5 | 135 | 3.8 | 1.08 | 1.504 | L | 2310 | 75 | 1460 | 45 |
| | | | | | | | W | 2400 | 70 | 1500 | 48 |
| Ex. 17 | 130 | 3.2 | 130 | 3.5 | 1.09 | 1.508 | L | 2280 | 83 | 1480 | 31 |
| | | | | | | | W | 2330 | 75 | 1510 | 30 |
| Ex. 18 | 135 | 3.7 | 138 | 3.9 | 1.05 | 1.502 | L | 2390 | 74 | 1520 | 42 |
| | | | | | | | W | 2410 | 73 | 1550 | 45 |
| Comp. Ex. 8 | 140 | 3.5 | 125 | 1.4 | 0.4 | 1.510 | L | 2320 | 74 | 1470 | 41 |
| | | | | | | | W | 1980 | 115 | 940 | 5 |
| Comp. Ex. 9 | 135 | 3.8 | 135 | 3.6 | 0.95 | 1.504 | L | 2420 | 71 | 1480 | 38 |
| | | | | | | | W | 2380 | 80 | 1100 | 8 |
| Comp. Ex. 10 | 130 | 2.8 | 135 | 3.6 | 1.28 | 1.507 | L | 2250 | 95 | 1050 | 9 |
| | | | | | | | W | 2420 | 72 | 1530 | 33 |
| Comp. Ex. 11 | 140 | 3.8 | 130 | 3.4 | 0.84 | 1.503 | L | 2400 | 70 | 1500 | 41 |
| | | | | | | | W | 2310 | 87 | 1020 | 7 |

EXAMPLE 19

EXPERIMENT I

Run 1(a)

Molten polythylene-2,6-naphthalate was extruded and the extrudate was quenched and solidified on a casting drum maintained at 60°C. to obtain an unstretched film having a thickness of about 330 microns.

The unstretched film was subjected to the stepwise biaxial stretching and heat treatment under the conditions indicated in Table 7. The resulting biaxially oriented and post-heat-treated film was positively deteriorated in the relaxed state at 200°C. in air, and changes in mechanical properties in the lengthwise direction were examined.

Run 1(b)

Run 1(a) was repeated except that the heat treatment of the unstretched film was carried out at the temperature indicated in Table 7.

Run 1'

Run 1(a) was repeated except that the heat treatment of the unstretched film was carried out at the temperature indicated in Table 7 to form a film as a comparison sample.

Run 2

Run 1(a) was repeated except that the conditions for the stepwise biaxial stretching and heat treatment were changed as shown in Table 7.

Run 2'

Run 2 was repeated except that the heat-treatment temperature was changed as shown in Table 7 to form a film and as a comparison sample.

RESULTS OF EXPERIMENT I

The results obtained in Run Nos. 1(a), 1(b), 1', 2 and 2' are shown in Table 7 below.

EXPERIMENT II

Run 3

Run 1(a) was repeated except that the draw ratios in the longitudinal direction and the widthwise direction were changed as shown in Table 8, and the temperature of the heat treatment was changed to 230°C.

Run 3' (Comparison)

Run 3 was repeated except that the draw ratios in the longitudinal and widthwise directions were changed as shown in Table 8.

RESULTS OF EXPERIMENT II

The results obtained in Run Nos. 3 and 3' are shown in Table 8.

TABLE 7

| Runs | Stretching conditions (Requirement i) | | | | | | Post heat treatment conditions | | | Requirement (iii) of resulting films | | | Requirement (ii) of resulting films: Elongation at breakage (percent) after further heat treatment 200°C., 200 hrs. under free shrinkage | Heat resistance test |
|---|---|---|---|---|---|---|---|---|---|---|---|---|---|---|
| | Direction (L) | | Direction (W) | | Stretch ratio (W)/ stretch ratio (L) | | Temperature (°C.) | Time (sec.) | Conditions allowing no free shrinkage | [n_L] | [η] | 0.3×[η] +1.361 | | |
| | Temperature (°C.) | Stretch ratio | Temperature (°C.) | Stretch ratio | | | | | | | | | | |
| 1(a) (invention) | 135 | 3.5 | 125 | 3.5 | 1.00 | | 225 | 10 | Maintaining a constant length both in the longitudinal and widthwise directions. | 1.502 | 0.53 | 1.520 | 35 | Passed. |
| 1(b) (invention) | 135 | 3.5 | 125 | 3.5 | 1.00 | | 220 | 10 | do | 1.499 | 0.53 | 1.520 | 31 | Do. |
| 1' (comparison) | 135 | 3.5 | 125 | 3.5 | 1.00 | | 210 | 10 | do | 1.491 | 0.53 | 1.520 | 9 | Not passed. |
| 2 (invention) | 135 | 3.5 | 130 | 3.8 | 1.08 | | 225 | 10 | do | 1.500 | 0.53 | 1.520 | 45 | Passed. |
| 2' (comparison) | 135 | 3.5 | 130 | 3.8 | 1.08 | | 210 | 10 | do | 1.489 | 0.53 | 1.520 | 8 | Not passed. |

TABLE 8

| Runs | Stretching conditions (Requirement i) | | | | | Post heat treatment conditions | | | Requirement (iii) of resulting films | | | Requirement (ii) of resulting films: Elongation at breakage (percent) after further heat treatment 200°C., 200 hrs. under free shrinkage | Heat resistance test |
|---|---|---|---|---|---|---|---|---|---|---|---|---|---|
| | Direction (L) | | Direction (W) | | Stretch ratio (W)/ stretch ratio (L) | Temperature (°C.) | Time (sec.) | Conditions allowing no free shrinkage | [n_L] | [η] | 0.3×[η] +1.361 | | |
| | Temperature (°C.) | Stretch ratio | Temperature (°C.) | Stretch ratio | | | | | | | | | |
| 3 (invention) | 135 | 3.4 | 130 | 3.9 | 1.15 | 230 | 10 | Maintaining a constant length both in the longitudinal and widthwise directions. | 1.503 | 0.53 | 1.520 | 37 | Passed. |
| 3' (comparison) | 135 | 3.0 | 130 | 4.5 | 1.50 | 230 | | do | 1.501 | 0.53 | 1.520 | 8 | Not passed. |

EXPERIMENT III

Runs 4-14

Run 2 was repeated except that polyethylene-2,6-naphthalate containing units derived from third components in the amount indicated in Table 9 were used.

Runs 4'-7' (Comparisons)

Runs 4-14 were repeated except that polyethylene-2,6-naphthalates containing units derived from third components in the amounts indicated in Table 9 were used.

RESULTS OF EXPERIMENT III

The results obtained in Runs 4-14 and Runs 4'-7' are shown in Table 9.

Molten polyethylene-2,6-naphthalate was extruded and the extrudate was quenched and solidified on a casting drum maintained at 60°C. to obtain an unstretched film having a thickness of about 330 microns.

The unstretched film was subjected to the stepwise biaxial stretching and heat treatment under the following conditions, LD drawing temperature = 135°C., LD draw ratio = 3.5 times, WD drawing temperature = 130°C., WD draw ratio = 3.8 times, and the post-heat-treatment temperature was 227°C. and its time was as shown in Table 10. The resulting biaxially oriented and post-heat treated film was positively deteriorated in the relaxed state at 200°C. in air, and changes in mechanical properties in the lengthwise direction were examined.

Table 9 (Part 1)

| | 3rd Components | | Stretching Conditions (Requirement i) | | | | Stretch ratio (W)/ stretch ratio (L) |
|---|---|---|---|---|---|---|---|
| | | | Direction (L) | | Direction (W) | | |
| Runs | Names | Amount of units (mol%) | Temperature (°C.) | Stretch ratio | Temperature (°C.) | Stretch ratio | |
| 4 | Dimethyl adipate | 3.5 | 135 | 3.5 | 130 | 3.8 | 1.08 |
| 5 | Isophthalic acid | 3.5 | do. | do. | do. | do. | do. |
| 6 | Naphthalene-2,7-dicarboxylic acid | 3.5 | do. | do. | do. | do. | do. |
| 7 | Naphthalene-2,7-dicarboxylic acid | 7.0 | do. | do. | do. | do. | do. |
| 4' | Naphthalene-2,7-dicarboxylic acid | 15.0 | do. | do. | do. | do. | do. |
| 8 | Terephthalic acid | 3.5 | do. | do. | do. | do. | do. |
| 9 | Terephthalic acid | 7.0 | do. | do. | do. | do. | do. |
| 5' | Terephthalic acid | 15.0 | do. | do. | do. | do. | do. |
| 10 | Methyl p-hydroxybenzoate | 3.5 | do. | do. | do. | do. | do. |
| 11 | Methyl-p-hydroxyethoxybenzoate | 3.5 | do. | do. | do. | do. | do. |
| 12 | Propylene glycol | 3.5 | do. | do. | do. | do. | do. |
| 6' | Propylene glycol | 15.0 | do. | do. | do. | do. | do. |
| 13 | Trimethylene glycol | 3.5 | do. | do. | do. | do. | do. |
| 14 | Trimethylene glycol | 7.0 | do. | do. | do. | do. | do. |
| 7' | Trimethylene glycol | 15.0 | do. | do. | do. | do. | do. |
| 15 | Napthhalene-2,7-dicarboxylic acid Diethyleneglycol | 1.5 2.2 | do. do. | do. do. | do. do. | do. do. | do. do. |

Table 9 (Part 2)

| | Post Heat Treatment Conditions | | | Requirement (iii) of Resulting Films | | | Requirement (iii) of Resulting Films: Elongation at Breakage (%) after furhter heat treatment 200°C., 200 hrs. under free shrinkage | Heat Resistance Test |
|---|---|---|---|---|---|---|---|---|
| Runs | Temperature (°C.) | Time (sec) | Conditions allowing no free shrinkage | $[n_z]$ | $[\eta]$ | $0.3 \times [\eta] + 1.361$ | | |
| 4 | 225 | 10 | Maintaining a constant length both in the longitudinal and widthwise directions | 1.503 | 0.55 | 1.526 | 45 | passed |
| 5 | do. | do. | do. | 1.506 | 0.56 | 1.529 | 36 | do. |
| 6 | do. | do. | do. | 1.505 | 0.58 | 1.535 | 53 | do. |
| 7 | do. | do. | do. | 1.515 | 0.59 | 1.538 | 35 | do. |
| 4' | do. | do. | do. | 1.525 | 0.54 | 1.523 | 7 | not passed |
| 8 | do. | do. | do. | 1.509 | 0.60 | 1.541 | 54 | passed |
| 9 | do. | do. | do. | 1.514 | 0.55 | 1.526 | 33 | do. |
| 5' | do. | do. | do. | 1.533 | 0.56 | 1.529 | 8 | not passed |
| 10 | do. | do. | do. | 1.511 | 0.56 | 1.529 | 32 | passed |
| 11 | do. | do. | do. | 1.509 | 0.55 | 1.526 | 33 | do. |
| 12 | do. | do. | do. | 1.508 | 0.56 | 1.529 | 29 | do. |
| 6' | do. | do. | do. | 1.530 | 0.51 | 1.514 | 5 | not passed |
| 13 | do. | do. | do. | 1.505 | 0.59 | 1.538 | 48 | passed |
| 14 | do. | do. | do. | 1.515 | 0.54 | 1.523 | 23 | do. |
| 7' | do. | do. | do. | 1.528 | 0.54 | 1.523 | 8 | not passed |
| 15 | do. | do. | do. | 1.508 | 0.58 | 1.535 | 30 | passed |

EXAMPLE 20

EXPERIMENT I

Runs 1-5

RESULTS OF EXPERIMENT I

The results obtain in Runs 1-5 are shown in Table 10 below.

Table 10

| Runs | Post heat treatment time(sec) | $n_z$ | $[\eta]$ | $0.3\times[\eta]+1.361$ | Elongational breakage (%) after further heat treatment 200°C., under free shrinkage | Heat Resistance test |
|---|---|---|---|---|---|---|
| 1 | 5 | 1.501 | 0.53 | 1.520 | 47 | passed |
| 2 | 15 | 1.500 | 0.53 | 1.520 | 48 | do. |
| 3 | 50 | 1.501 | 0.53 | 1.520 | 49 | do. |
| 4 | 300 | 1.502 | 0.53 | 1.520 | 46 | do. |
| 5 | 500 | 1.501 | 0.53 | 1.520 | 48 | do. |

EXPERIMENT II

Run 2' (Comparison)

Run 2 was repeated except that the post-heat treatment temperature was 248°C.

RESULTS OF EXPERIMENT II

The results obtained in Run 2' are shown in Table 11.

Table 11

| Run | $n_z$ | $[\eta]$ | $0.3\times[\eta]+1.361$ | Elongation at breakage (%) after fruther heat treatment 200°C., 200 hrs. under free shrinkage | Heat Resistance test |
|---|---|---|---|---|---|
| 2' | 1.515 | 0.53 | 1.520 | 3 | not passed |

While the present invention has been described primarily in connection with the foregoing exemplification, it should be understood that the present invention is to be in no way deemed as limited thereto, but, rather should be construed as broadly as any or all equivalence thereto.

What we claim is:

1. A biaxially oriented and post-heat-treated polyethylene-2,6-naphthalate insulating film composition consisting essentially of polyethylene-2,6-naphthalate in which at least 90 mol percent of the structural units are ethylene-2,6-naphthalate units and at most 10 mol percent of the structural units derived from a comonomer or comonomers having a divalent, ester-forming functional group or groups, said film being produced by biaxially stretching an unstretched film under heating conditions and post-heat-treating said film to a temperature of from 215°C. to 240°C. under such conditions as will not allow free shrinkage of the film; characterized in that (i) the stretch ratio in the widthwise direction is within a range of from about 3 to about 4 times based on the original width of the unstretched film, and the stretch ratio in the lengthwise direction is within a range of from about 3 to about 4 times based on the original length of the unstretched film, with the proviso that the stretch ratio in the widthwise direction to the stretch ratio in the lengthwise direction is from 1 to 4/3; (ii) the elongation at breakage of the resulting film is not less than 15 % when said biaxially oriented and post-heat-treated film is subjected to further heat treatment at 200°C. for 200 hours under such conditions as will allow free shrinkage of the film; and (iii) the thickness-direction refractive index $[n_z]$ of said biaxially oriented and post-heat-treated film, measured at 20°C. by Abbe's refractometer with use of a ray of a wavelength of 589 m$\mu$, is within a range expressed by the following formula:

$$1.499 \leq [n_z] \leq 1.520$$

and the intrinsic viscosity $[\eta]$ of said film, measured at 35°C. in a mixed solvent of phenol: 2,4,6-trichlorophenol at a weight ratio of 6:4, is within a range expressed by the following formula:

$$0.48 \leq [\eta] \leq 0.70$$

with a proviso that above $[n_z]$ and $[\eta]$ satisfy the following condition:

$$[n_z] = 0.3 \times [\eta] + 1.361$$

2. A biaxially oriented and post-heat-treated polyethylene-2,6-naphthalate insulating film composition as set forth in claim 1, wherein the stretch ratio in the widthwise direction is 1 – 1.2 times the stretch ratio in the lengthwise direction, the elongation at breakage after said further heat treatment is not less than 20 %, and said thickness-direction refractive index $[n_z]$ is within a range expressed by the following formula:

$$1.500 \leq [n_z] \leq 1.515$$

3. A process for the preparation of a biaxially oriented and post-heat-treated polyethylene-2,6-naphthalate insulating film composition, which comprises biaxially stretching an unstretched polyethylene-2,6-naphthalate film composition consisting essentially of polyethylene-2,6-naphthalate in which at least 90 mol percent of the structural units are ethylene-2,6-naphthalate units, and at most 10 mol percent of the structural units are units derived from a comonomer or comonomers having a divalent, ester-forming functional group or groups, at a stretch ratio in the widthwise direction within a range of from about 3 to about 4 times based on the original width of the unstretched film, and the stretch ratio in the lengthwise direction is within a range of from about 3 to about 4 times based on the original length of the unstretched film, with a proviso that the stretch ratio in the widthwise direction is 1 – 4/3 times to the stretch ratio in the lengthwise direction, the stretching in the widthwise direction being conducted at 115° – 150°C. and the stretching in the lengthwise direction being conducted at 120° – 160°C., and then subjecting the biaxially stretched film to the post-heat-treatment at 215° – 240°C. under such conditions as will not allow a shrinkage greater than 10 % to thereby obtain a biaxially oriented and post-heat-treated film wherein the elongation at breakage of the resulting film is not less than 15 %, when said film is subjected to further heat treatment at 200°C. for 200 hours under such conditions as will allow free shrinkage of the film; and the thickness-direction refractive index $[n_z]$ of said biaxially oriented and post-heat-treated film, measured at 20°C. by Abbe's refractometer, with use of a ray of a wavelength of 589 m$\mu$, is within a range expressed by the following formula:

$$1.499 \leq [n_z] \leq 1.520$$

and the intrinsic viscosity $[\eta]$ of said film, measured at 35°C. in a mixed solvent of phenol: 2,4,6-trichlorophenol at a weight ratio of 6:4, is within a range expressed by the following formula:

$$0.48 \leq [\eta] \leq 0.70$$

with a proviso that above $[n_z]$ and $[\eta]$ satisfy the following condition:

$$[n_z] \leq 0.3 \times [\eta] + 1.361$$

4. The process of claim 3 wherein the stretch ratio in the widthwise direction is from 1 to 1.2 times the stretch ratio in the lengthwise direction.

5. The process of claim 3 wherein said post-heat-treatment is conducted under such conditions which keep the film length constant.

* * * * *

UNITED STATES PATENT OFFICE
CERTIFICATE OF CORRECTION

PATENT NO. : 3,875,119
DATED : April 1, 1975
INVENTOR(S) : HIROSHI AOKI, ET AL.

It is certified that error appears in the above-identified patent and that said Letters Patent are hereby corrected as shown below:

In the Heading, insert the following:

-- Assignors to Teijin Limited of Osaka, Japan --

Signed and sealed this 1st day of July 1975.

(SEAL)
Attest:

RUTH C. MASON
Attesting Officer

C. MARSHALL DANN
Commissioner of Patents
and Trademarks